US 8,429,560 B2

United States Patent
Lection

(10) Patent No.: US 8,429,560 B2
(45) Date of Patent: Apr. 23, 2013

(54) METHODS AND SYSTEMS FOR DISPLAYING INPUT ITEMS ON A DISPLAY

(75) Inventor: David B. Lection, Raleigh, NC (US)

(73) Assignee: Scenera Technologies, LLC, Portsmouth, NH (US)

( * ) Notice: Subject to any disclaimer, the term of this patent is extended or adjusted under 35 U.S.C. 154(b) by 1372 days.

(21) Appl. No.: 11/669,568

(22) Filed: Jan. 31, 2007

(65) Prior Publication Data
US 2008/0184172 A1    Jul. 31, 2008

(51) Int. Cl.
*G06F 3/048* (2006.01)
(52) U.S. Cl.
USPC ............... 715/815; 715/788; 715/861
(58) Field of Classification Search .......... 715/844, 715/822, 788, 862, 815, 861
See application file for complete search history.

(56) References Cited

U.S. PATENT DOCUMENTS

| | | | |
|---|---|---|---|
| 5,736,974 A * | 4/1998 | Selker ........................ 715/862 |
| 6,073,036 A * | 6/2000 | Heikkinen et al. ......... 455/550.1 |
| 6,441,808 B1 * | 8/2002 | Hashimoto .................. 345/173 |
| 6,501,487 B1 * | 12/2002 | Taguchi ....................... 715/788 |
| 6,692,170 B2 | 2/2004 | Abir |
| 6,803,905 B1 * | 10/2004 | Capps et al. ................ 345/173 |
| 6,976,216 B1 | 12/2005 | Peskin et al. |
| 7,434,177 B1 * | 10/2008 | Ording et al. ............... 715/862 |
| 2004/0027395 A1 * | 2/2004 | Lection et al. .............. 345/855 |
| 2004/0027396 A1 * | 2/2004 | Lection ........................ 345/863 |
| 2005/0071778 A1 * | 3/2005 | Tokkonen ..................... 715/822 |
| 2005/0093826 A1 | 5/2005 | Huh |
| 2005/0223335 A1 * | 10/2005 | Ichikawa ....................... 715/801 |

FOREIGN PATENT DOCUMENTS

| CN | 1674597 | 9/2005 |
|---|---|---|
| JP | 05182367 | 7/2005 |

OTHER PUBLICATIONS

"Screen Magnification for Low Vision," [online] AbilityHub [retrieved Apr. 19, 2007] Retrieved from the Internet: <URL: http://www.abilityhub.com/vision/lowvision.htm> 2 pages.

* cited by examiner

*Primary Examiner* — Sara England

(57) ABSTRACT

Methods and systems are described for displaying input items on a display. In one embodiment, a first activation of a button representing a displayable input item is detected. Responsive to the first activation of the button, the displayable input item is displayed on a display at an initial display size without accepting selection of the displayable input item. The displayable input item is incrementally enlarged on the display over time until detecting a second activation of the button. Selection of the displayable input item is accepted responsive to the second activation of the button. The initial display size is set for the displayable input item based on a display size of the displayable input item when the second activation of the button is detected.

24 Claims, 3 Drawing Sheets

METHODS AND SYSTEMS FOR DISPLAYING INPUT ITEMS ON A DISPLAY

BACKGROUND

Vision-impaired individuals typically have problems reading displays, particularly on small mobile devices such as cell phones, personal digital assistants, digital cameras, and the like. In addition, the vision-impaired will typically have trouble seeing a label on a button or other input device. While glasses or other vision correction may mitigate the problem, in many cases user input can become frustrating for the vision-impaired. When such a user wants to use the device, e.g., use a cell phone for dialing a telephone number, additional assistance is needed that will allow the user to enter the phone number, or in other cases to enter a text string, selection, or other input.

Accordingly, there exists a need for methods, systems, and computer program products for displaying input items on a display.

SUMMARY

Methods and systems are described for displaying input items on a display. In one embodiment, a first activation of a button representing a displayable input item is detected. Responsive to the first activation of the button, the displayable input item is displayed on a display at an initial display size without accepting selection of the displayable input item. The displayable input item is incrementally enlarged on the display over time until detecting a second activation of the button. Selection of the displayable input item is accepted responsive to the second activation of the button. The initial display size is set for the displayable input item based on a display size of the displayable input item when the second activation of the button is detected.

BRIEF DESCRIPTION OF THE DRAWINGS

Objects and advantages of the present invention will become apparent to those skilled in the art upon reading this description in conjunction with the accompanying drawings, in which like reference numerals have been used to designate like or analogous elements, and in which.

DETAILED DESCRIPTION

Figure 1:
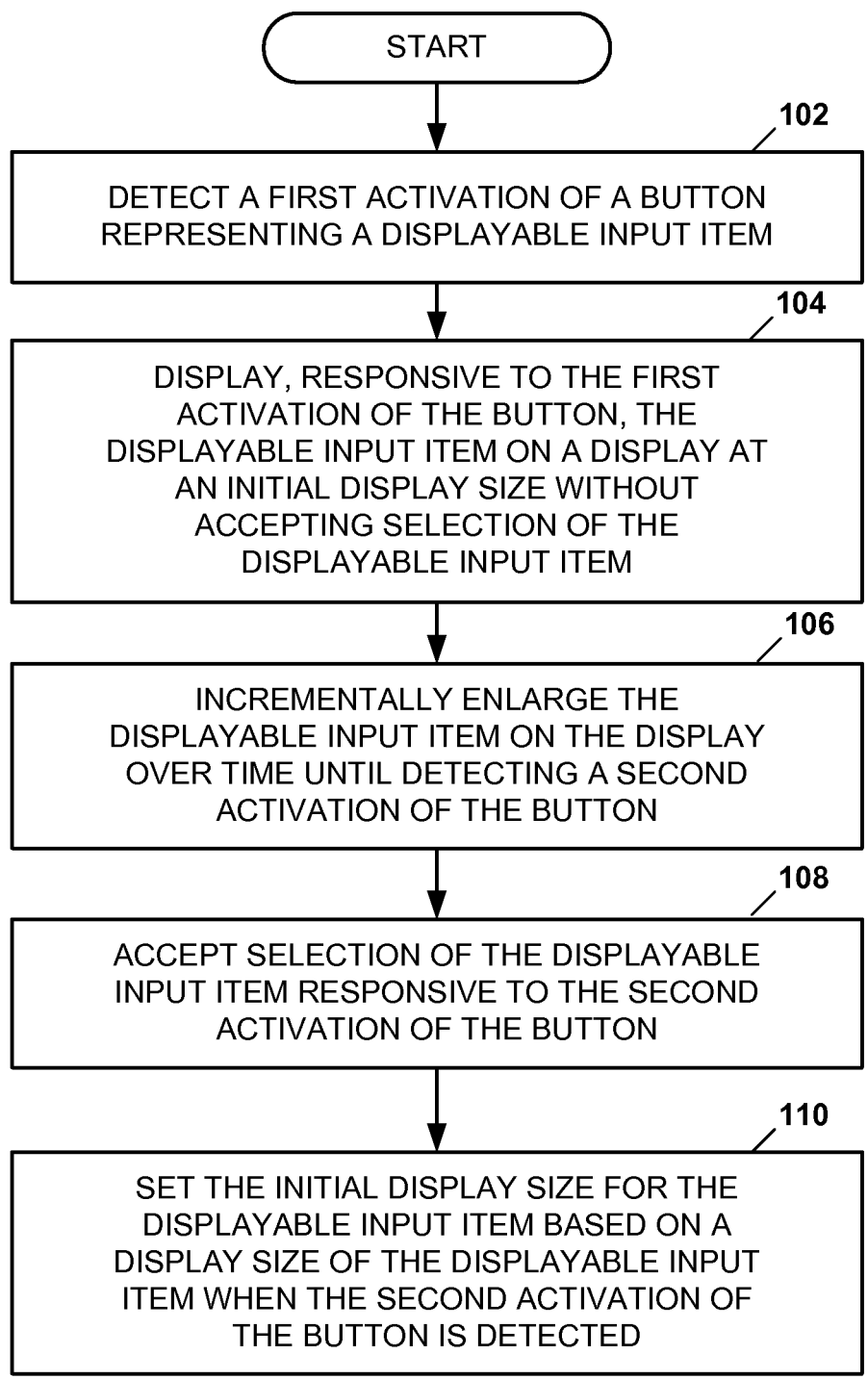
FIG. 1 is a flow diagram illustrating a system for displaying input items on a display according to an embodiment of the subject matter described herein.
Figure 2:
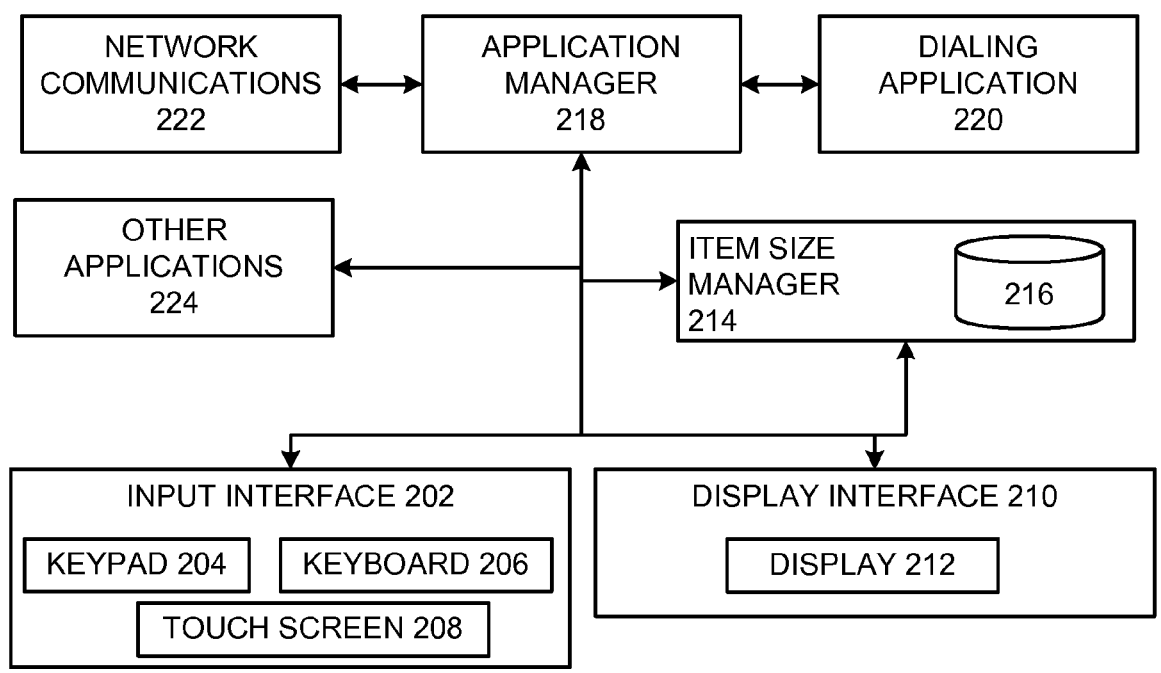
FIG. 2 is a block a diagram illustrating a method for displaying input items on a display according to another embodiment of the subject matter described herein.

FIG. 1 is a flow diagram illustrating a method for displaying input items on a display according to an exemplary embodiment of the subject matter described herein. FIG. 2 is a block diagram illustrating a system for displaying input items on a display according to another exemplary embodiment of the subject matter described herein. The method illustrated in FIG. 1 can be carried out by, for example, some or all of the components illustrated in the exemplary system of FIG. 2. The components shown in FIG. 2 can be included, for example, in any stationary display-based device, such as a computer and the like, or in any mobile display-based device, including cell phones, personal digital assistants, digital cameras, and the like.

With reference to FIG. 1, in block 102 a first activation of a button representing a displayable input item is detected. Accordingly, a system for displaying input items on a display includes means for detecting a first activation of a button representing a displayable input item. For example, as illustrated in FIG. 2, an input interface component 202 is configured for detecting a first activation of a button representing a displayable input item.

In one aspect, detecting a first activation of a button representing a displayable input item includes detecting a user's touch of a touch-sensitive button. For example, the input interface component 202 can be configured for detecting a user's touch at a touch-sensitive button either independently situated or included in a keypad 204 or a keyboard 206. Touch-sensitive buttons are well-known in this art. In general, when a user's finger comes in contact with a touch-sensitive button, an electrical capacitance or other characteristic changes at or near the button surface. A "touch" detection is made when this characteristic change is detected.

In another aspect, detecting a first activation of a button representing a displayable input item includes detecting a user's touch of a touch screen 208. For example, the input interface component 202 can be configured for detecting a user's touch at a touch screen 208. Touch screens 208 are also well-known in this art. In general, when a user's finger comes in contact with an area of a touch screen 208, a characteristic of the touch screen 208 surface is changed. A "touch" detection is made when this characteristic of the touch screen 208 changes.

In another aspect, detecting a first activation of a button representing a displayable input item includes detecting a user's press of a button. For example, the input interface component 202 can be configured for detecting a user's "press" of a button either independently situated or included as part of the keypad 204, keyboard 206, or touch screen 208. A press can be differentiated from a touch based on the amount of pressure applied to the button or touch screen 208. For example, pressure thresholds may be employed to distinguish a touch from a press. Often, touch-sensitive buttons offer two inputs, touch and press. The buttons described herein may refer to a touch-sensitive button, a press-sensitive button, an area of a touch screen, or any combination of this functionality. A part of the user's body need not apply the touch or press. Other mechanisms may be employed, such as the use of a stylus.

In any case, input interface component 202 detects the touch or press. Input interface component 202 can perform additional processing to determine the represented displayable input item. A represented displayable input item can be any item that corresponds to the button. For example a displayable input item can be one or more alphanumeric characters or a pictorial representation, such as an icon, a volume bar, a status, a shortcut, and the like. In some cases, a button can correspond to more than one alphanumeric character, such as in the case of the number and letter assignments on a conventional cell phone keypad, the shift assignments on a keyboard, and other such multi-use button arrangements.

Returning to FIG. 1, in block 104, responsive to the first activation of the button, the displayable input item is displayed on a display at an initial display size without accepting selection of the displayable input item. Accordingly, a system for displaying input items on a display includes means for displaying, responsive to the first activation of the button, the displayable input item on a display at an initial display size without accepting selection of the displayable input item. For example, as illustrated in FIG. 2, a display interface component 210 is configured for displaying, responsive to the first activation of the button, the displayable input item on a display at an initial display size without accepting selection of the displayable input item.

Display interface component 210 includes a display 212, which can be, for example, a liquid crystal display, a cathode ray tube display, a projector, and the like. Display interface component 210 also includes software and/or hardware for driving the display, such as a display driver. The represented displayable input item can be provided by input interface component 202 to display interface component 210, which displays the represented displayable input item on display 212.

Figure 3:
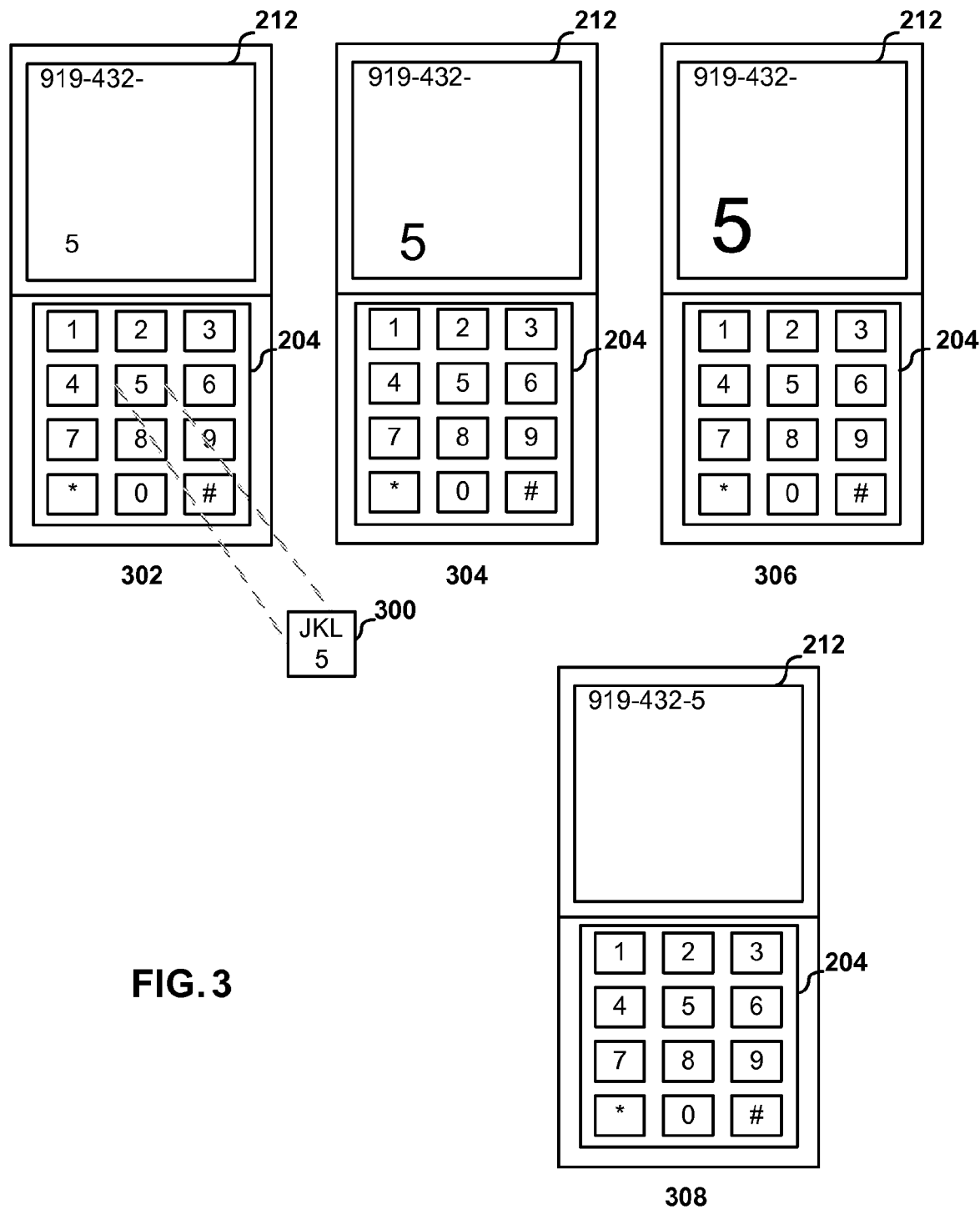
FIG. 3 is a block a diagram illustrating exemplary procedures for displaying input items on a display according to embodiments of the subject matter described herein.

FIG. 3 is a block diagram illustrating exemplary procedures for displaying input items on a display according to embodiments of the subject matter described herein. In FIG. 3, an exemplary button 300 is shown, which is a "5" button from a cell phone device in the example illustrated. There are four displayable input items represented by button 300: "5", "J", "K", and "L". In one embodiment, each of the four displayable input items can be cycled through by pressing or touching the button and releasing it a number of times. For example, a single touch or press can represent "5", a first touch or press, then release, then second touch or press can represent "J", and so on. This cycling through displayable input items represented by button 300 can continue, with the cycle returning back to the "5" character. Note that the button 300 may alternatively represent a single displayable input item, and the subject matter described herein can be applied to both of these embodiments.

Accordingly, in the current embodiment, detecting a first activation of a button representing a displayable input item includes determining whether a previous touch of the button followed by a release of the button occurred and displaying the displayable input item on a display includes selecting one of a plurality of displayable input items represented by the button based on the previous touch determination. For example, the input interface component 202 can be configured for determining whether a previous touch of the button followed by a release of the button occurred and wherein the display interface component 210 can be configured for selecting one of a plurality of displayable input items represented by the button based on the previous touch determination.

In another embodiment, a button represents a single displayable input item. Of course, there could be a mixture of single displayable input item buttons and multiple displayable input item buttons. In any case, the display interface component 210 displays the displayable input item on the display 212 at an initial size. The initial size can, for example, be a default smallest normal size for character display on the display 212 component. In FIG. 3, image 302 shows an example of an initial display of the character "5" in the device display.

At this point the displayable input item has not been "accepted" as a selection. More particularly, an input and/or command corresponding to the displayable input item has not been provided to other applications for carrying out an associated function at this point. For example, when dialing a phone number, the particular digit may not yet be added to the phone number. As shown in FIG. 2, input and/or commands corresponding to the displayable input item and/or button pressed or touched are typically provided to one or more applications through an application manager 218. The other applications can include a dialing application 220, a network communications application 222, or any of various other applications 224. In the current example illustrated by image 302 in FIG. 3, the "5" would not at this point be provided to the dialing application 224 adding to the dialed number "919-432-" shown on display 212. Thus, the displayable input item is not "accepted" for selection, which is the same as to say that the displayable input item is displayed on the display at an initial display size without accepting selection of the displayable input item.

Returning to FIG. 1, in block 106 the displayable input item is incrementally enlarged on the display over time until detecting a second activation of the button. Accordingly, a system for displaying input items on a display includes means for incrementally enlarging the displayable input item on the display over time until detecting a second activation of the button. For example, as illustrated in FIG. 2, the display interface component 210 is configured for incrementally enlarging the displayable input item on the display over time until detecting a second activation of the button.

After displaying the displayable input item at the initial display size on the display 212, the display interface component 210 incrementally enlarges the displayable input item. As illustrated in images 302, 304, and 306 of FIG. 3, the character "5" is incrementally enlarged over time. For example, the displayable input item can periodically be erased from the display 212 and re-displayed at a next largest display size, such as a next largest font size, a percentage size increase, and the like. Alternatively, the display size of the displayable input item may be enlarged without erasing the previous display of the displayable input item. The displayable input item continues to be enlarged until a second activation of the button is detected.

In one aspect, incrementally enlarging the displayable input item until detecting a second activation of the button includes incrementally enlarging the displayable input item until detecting a press of the button. For example, the display interface component 210 can be configured for incrementally enlarging the displayable input item until detecting a press of the button.

In another aspect, incrementally enlarging the displayable input item until detecting a second activation of the button includes incrementally enlarging the displayable input item until detecting a release of the button after a touch of the button or a press of the button. For example, the display interface component 210 can be configured for incrementally enlarging the displayable input item until detecting a release of the button after a touch of the button or a press of the button.

Returning to FIG. 1, in block 108 selection of the displayable input item is accepted responsive to the second activation of the button. Accordingly, a system for displaying input items on a display includes means for accepting selection of the displayable input item responsive to the second activation of the button. For example, as illustrated in FIG. 2, an input interface component 202 is configured for accepting selection of the displayable input item responsive to the second activation of the button.

In one aspect, accepting selection of the displayable input item responsive to the second activation of the button includes providing an input corresponding to the displayable input item to an application. For example, the input interface component 202 can be configured for providing an input corresponding to the displayable input item to one or more of applications 220, 222, and 224 via application manager 218 upon accepting selection of the displayable input item responsive to the second activation of the button. As discussed above, the second activation of the button can be a touch or a press. With reference to image 308 of FIG. 3, in the illustrated example the displayable input item "5" is provided to dialing application 220 and added to the dialed-in number once accepted. As illustrated in FIG. 3, the displayable input item may be displayed in a different area of display 212 before being accepted than it is displayed after being accepted.

Returning to FIG. 1, in block 110 the initial display size for the displayable input item is set based on a display size of the displayable input item when the second activation of the button 300 is detected. Accordingly, a system for displaying input items on a display includes means for setting the initial display size for the displayable input item based on a display size of the displayable input item when the second activation of the button is detected. For example, as illustrated in FIG. 2, an item size manager component 214 is configured for setting the initial display size for the displayable input item based on a display size of the displayable input item when the second activation of the button 300 is detected.

In one aspect, setting the initial display size for the displayable input item includes determining a display size for the displayable input item when the second activation of the button 300 is detected and associating the determined display size with the displayable input item as a minimum display size for displaying on the display 212. For example, the item size manager component 214 can be configured for setting the initial display size for the displayable input item by determining a display size for the displayable input item when the second activation of the button is detected and associating the determined display size with the displayable input item as a minimum display size for displaying on the display 212. Referring to image 306 of FIG. 3, the displayable input item "5" is shown at its largest display size prior to the second activation of the button 300. This display size can be provided by the display interface component 210 to the item size manager component 214. The item size manager component 214 associates this display size with the displayable input item for use in displaying the displayable input item in the future. For example, the item size manager component 214 can store an association between the displayable input item and the display size just prior to the second activation in a memory 216 accessible to the item size manager component 214. The associated display size can then become the initial size for future displaying of the displayable input item.

In another aspect, associating the determined display size with the displayable input item includes associating different display sizes with different displayable input items. For example, the item size manager component 214 can be configured for associating the determined display size with the displayable input item includes associating different display sizes with different displayable input items.

After setting the initial display size, the displayable input item is displayed on display 212 at the set initial display size responsive to a subsequent activation of the button. For example, the item size manager component 214 can be configured for, after setting the initial display size, displaying the displayable input item on the display at the set initial display size responsive to the input interface detecting a subsequent activation of the button. Accordingly, the next time a user presses the button 300, the displayable input item "5" is displayed using the initial size illustrated in image 306 of FIG. 3 instead of the previous initial size illustrated in image 302 of FIG. 3.

It should be understood that the various components illustrated in the various block diagrams represent logical components that are configured to perform the functionality described herein and may be implemented in software, hardware, or a combination of the two. Moreover, some or all of these logical components may be combined, some may be omitted altogether, and additional components can be added while still achieving the functionality described herein. Thus, the subject matter described herein can be embodied in many different variations, and all such variations are contemplated to be within the scope of what is claimed.

To facilitate an understanding of the subject matter described above, many aspects are described in terms of sequences of actions that can be performed by elements of a computer system. For example, it will be recognized that the various actions can be performed by specialized circuits or circuitry (e.g., discrete logic gates interconnected to perform a specialized function), by program instructions being executed by one or more processors, or by a combination of both.

Moreover, executable instructions of a computer program for carrying out the methods described herein can be embodied in any machine or computer readable medium for use by or in connection with an instruction execution machine, system, apparatus, or device, such as a computer-based or processor-containing machine, system, apparatus, or device, that can read or fetch the instructions from the machine or computer readable medium and execute the instructions.

As used here, a "computer readable medium" can be any means that can contain, store, or transport the computer program for use by or in connection with the instruction execution machine, system, apparatus, or device. The computer readable medium can be, for example, but not limited to, one or more of an electronic, magnetic, optical, and electromagnetic form, such that the instruction execution machine, system, apparatus, or device can read (or fetch) the instructions from the computer readable medium and execute the instructions for carrying out the described methods. More specific examples (a non-exhaustive list) of the computer readable medium can include the following: a portable computer diskette, a random access memory (RAM), a read only memory (ROM), an erasable programmable read only memory (EPROM or Flash memory), optical storage devices, including a portable compact disc (CD), a portable digital video disc (DVD), and the like.

Thus, the subject matter described herein can be embodied in many different forms, and all such forms are contemplated to be within the scope of what is claimed. It will be understood that various details of the invention may be changed without departing from the scope of the claimed subject matter. Furthermore, the foregoing description is for the purpose of illustration only, and not for the purpose of limitation, as the scope of protection sought is defined by the claims as set forth hereinafter together with any equivalents thereof entitled to.

What is claimed is:

1. A method for displaying input items on a display, the method comprising:
    detecting a first activation of a button representing a displayable input item;
    displaying, responsive to the first activation of the button, the displayable input item on a display at an initial display size without accepting selection of the displayable input item;
    incrementally enlarging, without user input, the displayable input item on the display over time until detecting a second activation of the button;
    accepting selection of the displayable input item responsive to the second activation of the button; and
    setting the initial display size for the displayable input item based on a display size of the displayable input item when the second activation of the button is detected.

2. The method of claim 1 wherein detecting a first activation of a button representing a displayable input item includes detecting a user's touch of one of a touch-sensitive button and a touch screen.

3. The method of claim 1 wherein detecting a first activation of a button representing a displayable input item includes detecting a user's press of a button.

4. The method of claim 1 wherein detecting a first activation of a button representing a displayable input item includes determining whether a previous touch of the button followed by a release of the button occurred and wherein displaying the displayable input item on a display includes selecting one of a plurality of displayable input items represented by the button based on the previous touch determination.

5. The method of claim 1 wherein incrementally enlarging the displayable input item until detecting a second activation of the button includes incrementally enlarging the displayable input item until detecting a press of the button.

6. The method of claim 1 wherein incrementally enlarging the displayable input item until detecting a second activation of the button includes incrementally enlarging the displayable input item until detecting a release of the button after one of a touch of the button and a press of the button.

7. The method of claim 1 wherein accepting selection of the displayable input item responsive to the second activation of the button includes providing an input corresponding to the displayable input item to an application.

8. The method of claim 1 wherein setting the initial display size for the displayable input item includes:
   determining a display size for the displayable input item when the second activation of the button is detected; and
   associating the determined display size with the displayable input item as a minimum display size for displaying on the display.

9. The method of claim 8 wherein associating the determined display size with the displayable input item includes associating different display sizes with different displayable input items.

10. The method of claim 1 comprising, after setting the initial display size, displaying, responsive to a subsequent activation of the button, the displayable input item on the display at the set initial display size.

11. The method of claim 1 wherein the displayable input item is displayed at a different location than the button representing the displayable input item.

12. A system for displaying input items on a display, the system comprising:
   means for detecting a first activation of a button representing a displayable input item;
   means for displaying, responsive to the first activation of the button, the displayable input item on a display at an initial display size without accepting selection of the displayable input item;
   means for incrementally enlarging, without user input, the displayable input item on the display over time until detecting a second activation of the button;
   means for accepting selection of the displayable input item responsive to the second activation of the button; and
   means for setting the initial display size for the displayable input item based on a display size of the displayable input item when the second activation of the button is detected,
   wherein at least one of the means includes at least one electronic hardware component.

13. A system having system components for displaying input items on a display, the system components comprising:
   an input interface component configured for detecting a first activation of a button representing a displayable input item;
   a display interface component configured for displaying, responsive to the first activation of the button, the displayable input item on a display at an initial display size without accepting selection of the displayable input item;
   the display interface component configured for incrementally enlarging, without user input, the displayable input item on the display over time until detecting a second activation of the button;
   the input interface component configured for accepting selection of the displayable input item responsive to the second activation of the button; and
   an item size manager component configured for setting the initial display size for the displayable input item based on a display size of the displayable input item when the second activation of the button is detected,
   wherein at least one of the system components includes at least one electronic hardware component.

14. The system of claim 13 wherein the input interface component is configured for detecting a user's touch at one of a touch-sensitive button and a touch screen.

15. The system of claim 13 wherein the input interface component is configured for detecting a user's press of a button.

16. The system of claim 13 wherein the input interface component is configured for determining whether a previous touch of the button followed by a release of the button occurred and wherein the display interface component is configured for selecting one of a plurality of displayable input items represented by the button based on the previous touch determination.

17. The system of claim 13 wherein the display interface component is configured for incrementally enlarging the displayable input item until detecting a press of the button.

18. The system of claim 13 wherein the display interface component is configured for incrementally enlarging the displayable input item until detecting a release of the button after one of a touch of the button and a press of the button.

19. The system of claim 13 wherein the input interface component is configured for providing an input corresponding to the displayable input item to an application upon accepting selection of the displayable input item responsive to the second activation of the button.

20. The system of claim 13 wherein the item size manager component is configured for setting the initial display size for the displayable input item by:
   determining a display size for the displayable input item when the second activation of the button is detected; and
   associating the determined display size with the displayable input item as a minimum display size for displaying on the display.

21. The system of claim 20 wherein the item size manager component is configured for associating the determined display size with the displayable input item includes associating different display sizes with different displayable input items.

22. The system of claim 13 wherein the item size manager component is configured for, after setting the initial display size, displaying the displayable input item on the display at the set initial display size responsive to the input interface detecting a subsequent activation of the button.

23. The system of claim 13 wherein the display interface component is further configured to display the displayable input item at a different location than the button representing the displayable input item.

24. A non-transitory computer readable medium including a computer program, executable by a machine, for displaying input items on a display, the computer program comprising executable instructions for:
- detecting a first activation of a button representing a displayable input item;
- displaying, responsive to the first activation of the button, the displayable input item on a display at an initial display size without accepting selection of the displayable input item;
- incrementally enlarging, without user input, the displayable input item on the display over time until detecting a second activation of the button;
- accepting selection of the displayable input item responsive to the second activation of the button; and
- setting the initial display size for the displayable input item based on a display size of the displayable input item when the second activation of the button is detected.

* * * * *